Figure 1:
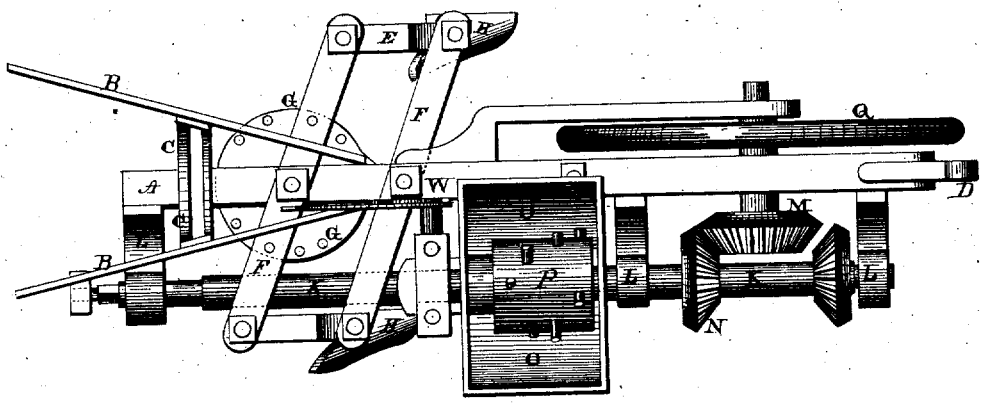
Figure 2:
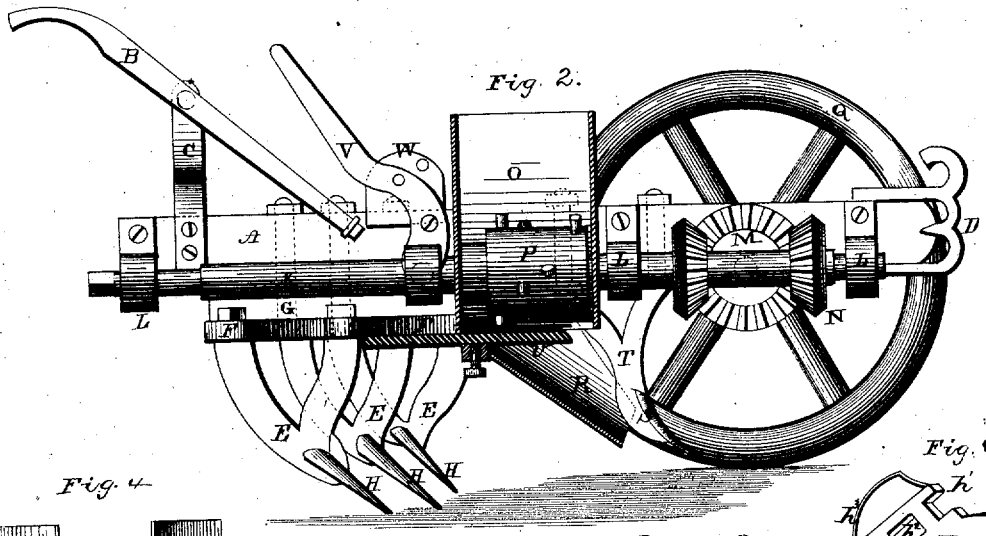
Figure 4:
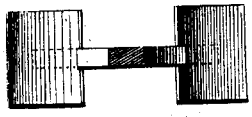
Figure 3:
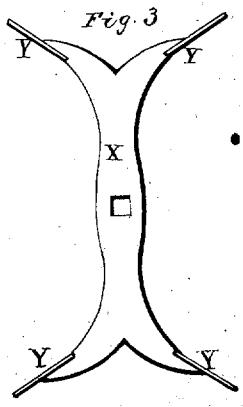
Figure 5:
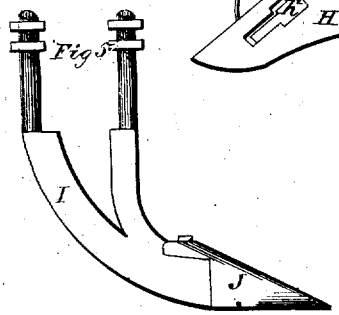
Figure 6:
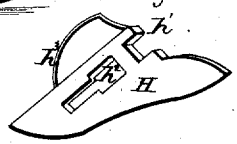

A. G. W. FOSTER.

Cultivators.

No. 6,054.

Reissued Sept. 22, 1874.

WITNESSES.

Frank Clancy

J. Wm. Garner

INVENTOR.

A. G. W. Foster per

F. A. Lehmann atty.

THE GRAPHIC CO. PHOTO-LITH. 39 & 41 PARK PLACE, N.Y.

UNITED STATES PATENT OFFICE.

ABRAHAM G. W. FOSTER, OF NEWNAN, GEORGIA.

IMPROVEMENT IN CULTIVATORS.

Specification forming part of Letters Patent No. 108,580, October 25, 1870; reissue No. 6,054, dated September 22, 1874; application filed August 17, 1874.

DIVISION A.

*To all whom it may concern:*

Be it known that I, ABRAHAM G. W. FOSTER, of Newnan, in the county of Coweta and State of Georgia, have invented certain new and useful Improvements in Cultivators; and do hereby declare that the following is a full, clear, and exact description thereof, that will enable others skilled in the art to which it appertains to make and use the same, reference being had to the accompanying drawings and to the letters of reference marked thereon, which form a part of this specification.

The nature of my invention consists in the construction and arrangement of a cotton or other cultivator, as will be hereinafter more fully set forth.

In order to enable others skilled in the art to which my invention appertains to make and use the same, I will now proceed to describe its construction and operation, referring to the annexed drawing, which represents my invention.

A represents the beam, to the rear part of which are attached the forward ends of the handles B, the rear parts of the same being supported and held in their proper relative position by the brace C. At the forward end of the beam A is attached a clevis, D, to which the draft is attached. E E represent three plow-standards, the upper ends of which are forked, as shown. The branches of the central standard pass up through the centers of two cross-bars, F F, and through holes in the beam A, and are secured by nuts on the upper side thereof, while the branches of the two side standards pass up through holes in the ends of said cross-bars F F, and secured thereto by nuts.

By this construction, by setting the bars F at a greater or lesser angle with the line of draft, the plows will be adjusted closer together or farther apart, as may be required.

When planting cotton the plows will be reversed and adjusted the requisite distance apart, so as to throw the earth inward, and cover the seed dropped in the furrow opened by a suitable plow, S, in front.

To the under side of the beam A is rigidly attached a circle or disk, G, along the under side of which the cross-bars F pass, and to which the rear cross-bar is secured by pins or bolts passing through holes in the said bar, and through one or the other of a series of holes arranged in circular form through the disk G. H represents the plows, the upper edges of which have notches $h^1$ formed in them to receive a shoulder formed upon the lower part of the plow-standards E. In the body of the plows H are formed slots $h^2$, the upper ends of which are made enlarged, to receive the dovetailed head or catch formed upon or attached to the lower part of the plow-seat, and which, when the plow is slipped up to its place, enters the dovetailed lower part of said slot, where it is secured in place by a bolt passing through the enlarged upper part of said slot, so that the plow cannot work down.

To one side of the plows H may be attached, or upon it may be formed a cutter, $h^3$, as shown.

For subsoiling, the plows H and standards E may be removed, and plows J, provided with standards I, substituted in their places.

A suitable seeding attachment may be combined with this cultivator.

Having thus fully described my invention, what I claim as new, and desire to secure by Letters Patent, is—

1. The cross-bars F F, perforated disk G, and bifurcated standards E E, all constructed and arranged substantially as and for the purposes herein set forth.

2. The plows H, made with a notch, $h^1$, at their upper end, and a slot, $h^2$, enlarged at its upper end and dovetailed at its lower end, to adapt them for convenient attachment to the standards E, substantially as herein shown and described, and for the purpose set forth.

In testimony that I claim the foregoing I have hereunto set my hand this 5th day of August, 1874.

ABRAHAM G. W. FOSTER.

Witnesses:
E. D. FOUSE,
JAS. M. GLASS.